(12) United States Patent
Schmidt et al.

(10) Patent No.: US 9,241,282 B2
(45) Date of Patent: Jan. 19, 2016

(54) MINIMIZATION OF DRIVE TESTS UPLINK MEASUREMENTS

(75) Inventors: Andreas Schmidt, Braunschweig (DE); Rongzhen Yang, Shanghai (CN)

(73) Assignees: Intel Deutschland GmbH, Neubiberg (DE); Intel Corporation, Santa Clara, CA (US)

( * ) Notice: Subject to any disclaimer, the term of this patent is extended or adjusted under 35 U.S.C. 154(b) by 61 days.

(21) Appl. No.: 13/977,035

(22) PCT Filed: May 4, 2012

(86) PCT No.: PCT/EP2012/058298
§ 371 (c)(1),
(2), (4) Date: Jun. 28, 2013

(87) PCT Pub. No.: WO2013/135310
PCT Pub. Date: Sep. 19, 2013

(65) Prior Publication Data
US 2015/0109939 A1    Apr. 23, 2015

Related U.S. Application Data

(60) Provisional application No. 61/612,015, filed on Mar. 16, 2012.

(51) Int. Cl.
*H04W 24/10*    (2009.01)
*H04W 24/08*    (2009.01)

(52) U.S. Cl.
CPC .............. *H04W 24/10* (2013.01); *H04W 24/08* (2013.01)

(58) Field of Classification Search
CPC ..... H04W 24/10; H04W 24/08; H04W 24/02; H04W 16/18
See application file for complete search history.

(56) References Cited

U.S. PATENT DOCUMENTS

2010/0190488 A1* 7/2010 Jung et al. ............ 455/424
2011/0195668 A1* 8/2011 Lee et al. ............. 455/67.11
(Continued)

FOREIGN PATENT DOCUMENTS

WO    2011/050846 A1    5/2011

OTHER PUBLICATIONS

International Search report and Written Opinion Received for PCT Application No. PCT/EP2012/058298, mailed on Oct. 8, 2012, 13 pages.
(Continued)

*Primary Examiner* — Paul H Masur
*Assistant Examiner* — Kabir Jahangir
(74) *Attorney, Agent, or Firm* — Schwabe, Williamson & Wyatt, P.C.

(57) ABSTRACT

A method and radio access network device includes a processing unit configured to: separate a network measurement configuration command into at least first network measurements and second network measurements; forward the first network measurements of the network measurement configuration command over an air interface to a user equipment; receive, from the user equipment, the first network measurements on downlink communication channels to form first network measurement results; perform, in the radio access network device, the second network measurements on uplink communication channels to form second network measurement results; and combine, in the radio access network device, the first network measurement results from the user equipment with the second network measurement results from the radio access network device to form an aggregated network measurement report.

17 Claims, 12 Drawing Sheets

(56) References Cited

U.S. PATENT DOCUMENTS

| | | | |
|---|---|---|---|
| 2011/0306345 A1* | 12/2011 | Wu | 455/436 |
| 2012/0088457 A1* | 4/2012 | Johansson et al. | 455/67.11 |
| 2012/0106386 A1* | 5/2012 | Johansson et al. | 370/252 |
| 2013/0114446 A1* | 5/2013 | Liu et al. | 370/252 |
| 2013/0114454 A1* | 5/2013 | Hwang et al. | 370/252 |
| 2013/0190031 A1* | 7/2013 | Persson et al. | 455/517 |
| 2013/0288664 A1* | 10/2013 | Bodog et al. | 455/422.1 |

OTHER PUBLICATIONS

3rd Generation Partnership Project; Technical Specification Group Services and System Aspects; Telecommunication management; Subscriber and equipment trace; Trace control and configuration management (Release 11)3GPP TS 32.422 V11.02.0, Dec. 22, 2011, pp. 1-120.

Mediatek: "[76#33] MDT Scheduled IP Throughput Measurement", Jan. 31, 2012.

Malgorzata Tomala et al. "Supporting Function: Minimisation of Drive Tests (MDT)", Dec. 9, 2011, pp. 267-310.

Ericsson et al. "Discussion on Architecture for MDT" Oct. 12, 2009.

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), Dec. 22, 2011. pp. 1-18.

* cited by examiner

MINIMIZATION OF DRIVE TESTS UPLINK MEASUREMENTS

RELATED APPLICATIONS

This application is a national stage entry according to 35 U.S.C. §371 of PCT application No. PCT/EP2012/058298 filed on May 4, 2012, which claims priority from U.S. Provisional application No. 61/612,015 filed on Mar. 16, 2012.

TECHNICAL FIELD

Aspects of this disclosure relate generally to managing network measurements. In particular, an aspect of this disclosure relates to measuring uplink parameters for minimization of drive tests.

BACKGROUND

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

Minimization of drive tests (MDT) is a test performed by service providers for coverage optimization by using a user equipment (UE) instead of using a specialized device, such as equipment inside of an automobile. The coverage area of a base station in a mobile communications network varies depending on a location of a base station (BS), deployment of buildings nearby, a user's usage environment, etc. Therefore, it is required for the service providers to periodically perform the drive test, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a log file containing at least one MDT measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in a radio resource control (RRC) idle mode, but the immediate MDT performs the MDT measurement in an RRC connected mode.

SUMMARY

In an aspect of this disclosure, a method is provided for managing network measurements. The method comprising: separating a network measurement configuration command into at least first network measurements and second network measurements; forwarding the first network measurements of the network measurement configuration command over an air interface to a user equipment; receiving, from the user equipment, the first network measurements on downlink communication channels to form first network measurement results; and performing, in a radio access network, the second network measurements on uplink communication channels to form second network measurement results.

In an aspect of this disclosure, a radio access network device is provided. The radio access network device comprises: a memory element; and a processing unit coupled to the memory element, the processing unit configured to: separate a network measurement configuration command into at least first network measurements and second network measurements; forward the first network measurements of the network measurement configuration command over an air interface to a user equipment; receive, from the user equipment, the first network measurements on downlink communication channels to form first network measurement results; perform, in the radio access network device, the second network measurements on uplink communication channels to form second network measurement results; and combine, in the radio access network device, the first network measurement results from the user equipment with the second network measurement results from the radio access network device to form an aggregated network measurement report.

An aspect of this disclosure provides a system for managing network measurements. The system comprises a radio access network and a user equipment. The radio access network device may be configured to: separate a network measurement configuration command into at least first network measurements and second network measurements; forward the first network measurements of the network measurement configuration command over an air interface to a user equipment; perform the second network measurements on uplink communication channels to form second network measurement results; and combine a first network measurement results from the user equipment with the second network measurement results from the radio access network device to form an aggregated network measurement report. The user equipment may be configured to perform the first network measurements on downlink communication channels to form first network measurement results.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

Figure 1:
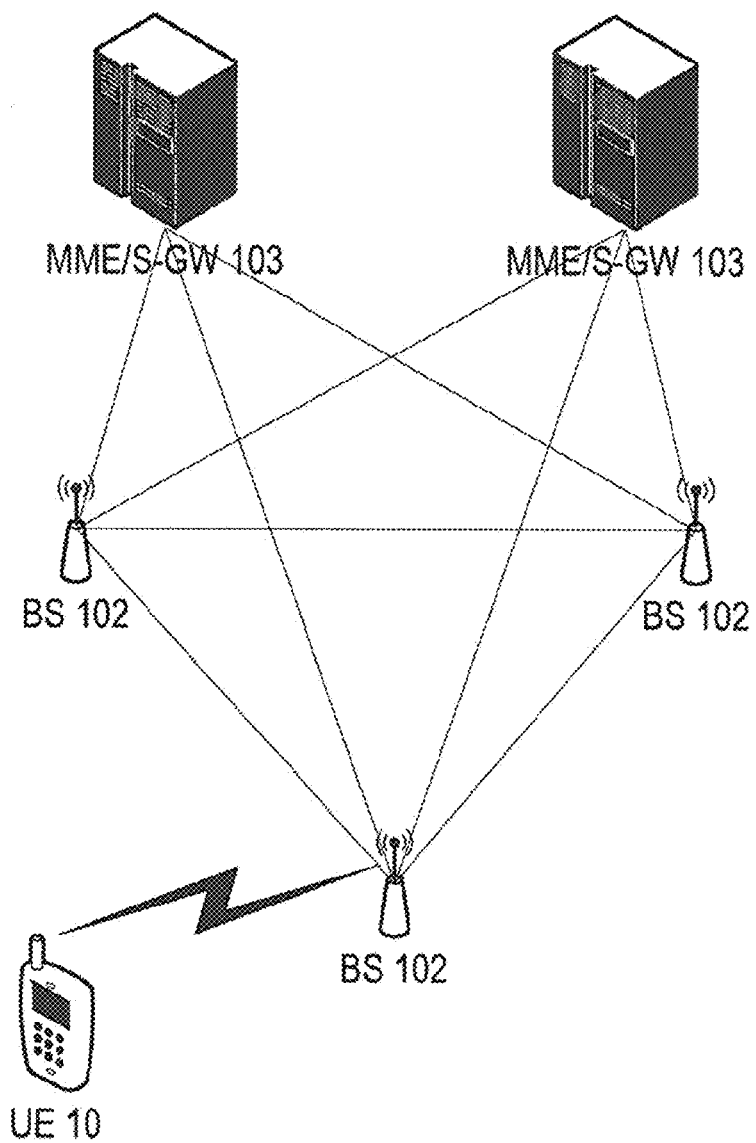
FIG. 1 shows a wireless communication system to which various embodiments are applied in accordance with an aspect of this disclosure.

The following detailed description refers to the accompanying drawings that show, by way of illustration, specific details and aspects in which various embodiments may be practiced. The word "exemplary" is used herein to mean "serving as an example, instance, or illustration". Any aspect or design described herein as "exemplary" is not necessarily to be construed as preferred or advantageous over other aspects or designs.

Note that in this Specification, references to various features (e.g., elements, structures, modules, components, steps, operations, characteristics, etc.) included in "one aspect", "example aspect", "an aspect", "another aspect", "some aspects", "various aspects", "other aspects", "alternative aspect", and the like are intended to mean that any such features are included in one or more aspects of the present disclosure, but may or may not necessarily be combined in the same aspects.

Note that in this Specification, references to "a number of" may mean one or more. For example, a number of objects may be one object, ten objects, fifty objects, or any number of objects. Also note that in this Specification, references to "at least one of" may mean any combination. For example, at least one of object A and object B may be object A, object B, or both objects A and B.

Although the description is illustrated and described herein with reference to certain aspects, the description is not intended to be limited to the details shown. Modifications may be made in the details within the scope and range equivalents of the claims.

In Rel-11 of the 3GPP standards, the MDT functionality will be enhanced. New use cases related to UL Coverage Optimization, QoS Verification and IP Throughput Measurements have been identified. These new use cases place some new MDT requirements on the core network and on the RAN, respectively. In the past, the MDT configuration was always passed on to one or more UEs being served by the particular eNB. Consequently, only downlink parameters could be measured and collected in the past in the scope of MDT. Now, the eNB itself has to perform certain measurements (pertaining to UL traffic), and to combine the results of this eNB based measurements later on with the results reported by the UE over the Uu air interface.

For both RATs (HSPA and LTE), 3GPP is currently in a process of specifying coordinated multipoint transmissions/reception techniques, where more than just one base station is involved in communication with a particular UE. The aspects of this disclosure also cover the use case where MDT UL Measurements need to be collected by more than one base station (i.e. one particular UE is being served by more than one eNB), or when MDT UL Measurements are a combined effort by several CN and RAN nodes (depending on what protocol layer we look at and on what RAT is deployed). For sake of simplicity, this disclosure only describes the case where one RAN node or one CN node is involved in the collection of MDT UL Measurements, but the scope of this disclosure explicitly covers coordinated multipoint transmissions/reception techniques as well.

The different aspects of this disclosure provide a New Parameter in MDT Configuration (received from the EM). In the MDT configuration (at least) one new parameter is added to turn on/off MDT Uplink Measurements. This new parameter may be used to indicate that the TCE ("MDT Server") is interested in UL Coverage Optimization and/or QoS Verification and/or IP Throughput Measurements on the eNB side.

The different aspects of this disclosure also provide a new eNB Behaviour for Handling the MDT Configuration. In the CN node or RAN node, the trace-based MDT configuration is split into two parts. The (at least) one new parameter is processed on the CN/RAN side for performing the requested UL measurements, while the rest of the MDT configuration parameters is sent over the air interface to the respective UE.

Additionally, the different aspects of this disclosure provide a new eNB behaviour for aggregating MDT reports. On the CN/RAN side, the MDT UL measurements performed in the RNC/NB/eNB itself and the measurements collected by the UE may be combined in a single trace-base MDT report.

Additionally, the different aspects of this disclosure provide a new data element in the MDT report (addressed to TCE). In the trace-based MDT report, (at least) one new parameter is added for the MDT UL measurements. This new parameter may be used to convey the UL Coverage Optimization data and/or QoS Verification results and/or IP Throughput Measurements to the TCE ("MDT Server").

The different aspects of this disclosure provide support for the new use cases for MDT in Rel-11. The RNC/NB/eNB can identify which parts of the received trace-based MDT configuration are destined for itself (which parts need to be passed on to other NBs/eNBs, in case of coordinated multipoint transmission/reception) and which parts need to be passed on to the respective UE. The eNB(s) can then start performing MDT UL measurements as requested by the TCE ("MDT Server"), and later on generate a combined trace-based MDT report.

FIG. 1 shows a wireless communication system to which various embodiments are applied in accordance with an aspect of this disclosure. The wireless communication system may also be referred to as an evolved-UMTS terrestrial radio access network (E-UTRAN) or a long term evolution (LTE)/LTE-A system.

The E-UTRAN includes at least one base station (BS) 102 which provides a control plane and a user plane to user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 102 is generally a fixed station that communicates with the UE 10 and may be referred to as another terminology, such as an evolved node-B (eNB), node-B (NB), a base transceiver station (BTS), an access point, etc.

The BSs 102 are interconnected by an interface. The BSs 102 are also connected by another interface to a core network, which (in case of LTE) may be an evolved packet core (EPC) 316, more specifically, to a mobility management entity (MME) and a serving gateway (S-GW) 318, or (in case of UMTS) a GPRS core network 308, more specifically, to a SGSN (Serving GPR Support Node) 310.

The EPC 316 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The MDT is a test performed by service providers for coverage optimization by using a UE instead of using an automobile. Coverage varies depending on a location of a BS, deployment of buildings nearby, a user's usage environment, etc. Therefore, it is required for the service providers to periodically perform drive tests, and a lot of costs and resources are consumed. The MDT is used when the service provider measures the coverage by using the UE.

The MDT can be classified into a logged MDT and an immediate MDT. In the logged MDT, after performing the MDT measurement, the UE delivers a log file containing at least one MDT measurement to a network available at a time of satisfying a reporting condition. In the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

The service providers can utilizes the MDT measurement results to generate a coverage map which represents qualities of services and availabilities of services. For example, if any problem of a coverage occurs, the service providers may extend the coverage of corresponding cell by increasing transmission powers of a BS.

Figure 2:
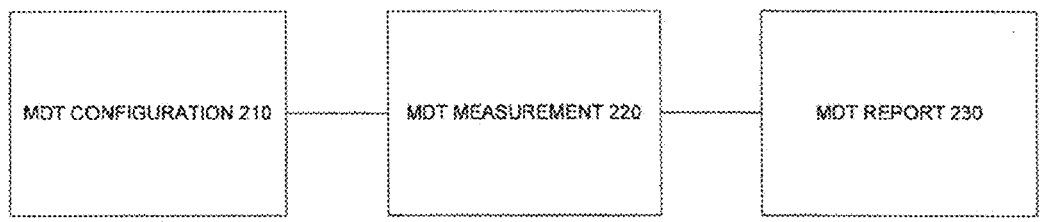
FIG. 2 shows a procedure of performing MDT in accordance with an aspect of this disclosure.

FIG. 2 shows a procedure of performing MDT in accordance with an aspect of this disclosure. The MDT includes an MDT configuration 210, an MDT measurement 220, and an MDT report 230 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

An aspect of this disclosure provides that the core network functionality for the configuration of MDT (comprising instructions what kind of devices should be selected for MDT measurements by the eNB, and where the collected MDT reports should be sent to) are based on the existing Trace functionality. A trace-based MDT configuration is first propagated from the EM to the eNB and then passed over the air interface to the UE where all MDT measurements take place. In Rel-10 of the 3GPP standard, MDT does not require the eNB to measure anything. The only thing that the eNB has to do is collect MDT measurements from the UE and use the trace-based MDT reporting mechanisms to convey the MDT reports back to the TCE ("MDT Server").

In order to distinguish the MDT messages that are exchanged over the air interface form those MDT messages that are exchanged between core network entities, the following terms are introduced and used in this disclosure: trace-based MDT Configuration, and trace-based MDT Reporting.

In order to distinguish those MDT measurements that take place in the UE from those MDT measurements that take place in the CN and/or certain RAN nodes, the following term is introduced and used in the sequel of this document: MDT UL Measurements.

For convenience and understanding, in this disclosure, E-UTRA (i.e. LTE) and in most cases LTE terminology is used. However, it should be noted that the principles can be easily applied to the HSPA (i.e. UMTS) suite of standards. Physical layer parameters of the uplink radio access (as required for the UL Coverage Optimization use case) can be measured by the respective base station in both cases. Because of the different protocol termination points, it is not suitable to just replace the word "eNB" with "NB" when it comes to "higher layer" measurements for QoS Verification and IP Throughput Measurement. In HSPA these types of UL measurements may be done in the RNC. Some of the new parameter(s) (primarily, the non-physical layer parameters) for uplink measurements may be assessed in the RNC network node in case of UMTS (instead of in the eNB).

Figure 3:
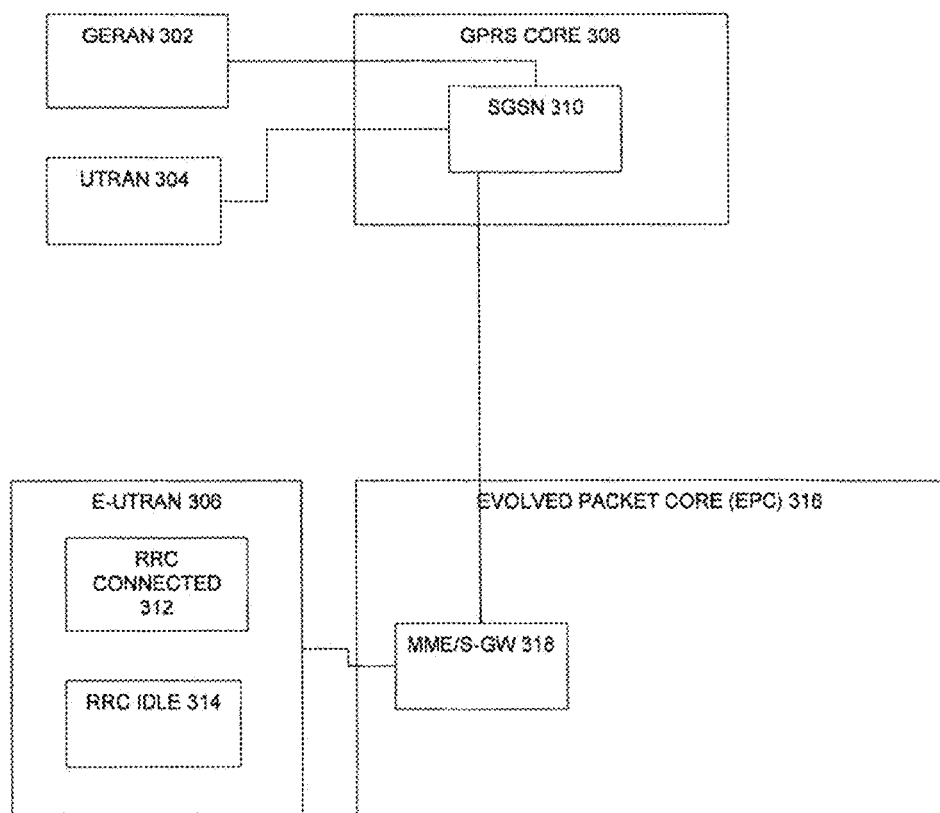
FIG. 3 is an illustration of mobility support in E-UTRA in accordance with an aspect of this disclosure.

FIG. 3 is an illustration of the general 3GPP Network Architecture with three different Radio Access Networks (RANs) in accordance with an aspect of this disclosure.

The three different RANs are GERAN 302, UTRAN 304, and E-UTRAN 306. A user equipment may be operable on one or more RANs.

GERAN 302 is an abbreviation for GSM EDGE Radio Access Network (also referred to as 2 G and 2.5 G).

UTRAN 304 stands for UMTS Terrestrial Radio Access Network and is a collective term for the NodeBs and Radio Network Controllers (RNCs) which make up the UMTS radio access network. This communication network, commonly referred to as 3 G, can carry many traffic types from real-time Circuit Switched to IP based Packet Switched. The UTRAN contains at least one NodeB that is connected to at least one Radio Network Controller (RNC). An RNC provides control functionalities for one or more NodeB(s). A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

GERAN 302 and UTRAN 304 are connected to the GPRS core network 308 through Serving GPRS Support Node (SGSN) 310. GPRS core network 308 is the central part of the General Packet Radio Service which allows 2 G, 3 G and WCDMA mobile networks to transmit IP packets to external networks such as the Internet. The GPRS system is an integrated part of the GSM network switching subsystem. Serving GPRS Support Node (SGSN) 310 is responsible for the delivery of data packets from and to the mobile stations within its geographical service area. Its tasks include packet routing and transfer, mobility management (attach/detach and location management), logical link management, and authentication and charging functions.

E-UTRAN 306 is the new 3GPP Radio Access Network for LTE that is currently being worked on. The proposed E-UTRA air interface uses OFDMA for the downlink (tower to handset) and Single Carrier FDMA (SC-FDMA) for the uplink (handset to tower). It employs MIMO with up to four antennas per station. The use of OFDM enables E-UTRA to be much more flexible in its use of spectrum than the older CDMA based systems, such as UTRAN. OFDM has a link spectral efficiency greater than CDMA, and when combined with modulation formats such as 64 QAM, and techniques as MIMO, E-UTRA is expected to be considerably more efficient than W-CDMA with HSDPA and HSUPA.

A user device may be in two different radio resource control modes in E-UTRA. The first mode is connected mode 312 and the second mode is idle mode 314.

Idle mode 314 may be when mobility is controlled by UE. A UE specific DRX may be configured by upper layers.

The UE may acquire system information (SI); monitors a paging channel to detect incoming calls, system information change, and for ETWS capable UEs, ETWS notifications, and for CMAS capable UEs, CMAS notification; performs neighboring cell measurements for the cell (re-)selection process.

Connected mode 312 may be when an RRC connection has been established. Mobility is controlled by the network (handover and cell change order). At lower layers the UE may be configured with a UE specific DRX.

The UE may acquire system information (SI); monitor a paging channel and/or SIB Type 1 content to detect SI change, and for ETWS capable UEs, ETWS notifications, and for CMAS capable UEs, CMAS notification; monitor the control channels associated with the shared data channel to determine if data is scheduled for it; provide channel quality and feedback information; and/or perform neighbouring cell measurements and measurement reporting to assist the network in making handover decisions.

E-UTRAN 306 may be connected to evolved packet core (EPC) 316 through MME/S-GW 318. MME/S-GW 318 may be an example of MME/S-GW 103 as shown in FIG. 1. EPC 316 may be the central part of the mobile core network for LTE.

Figure 4:
FIG. 4 is a block diagram showing a wireless communication system in accordance with an aspect of this disclosure.

FIG. 4 is a block diagram showing a wireless communication system in accordance with an aspect of this disclosure.

A BS 402 includes a processor 404, a memory 406, and a radio frequency (RF) unit 408. The memory 406 is coupled to the processor 404, and stores a variety of information for driving the processor 404. The RF unit 408 is coupled to the processor 404, and transmits and/or receives a radio signal.

The processor 404 implements the proposed functions, processes and/or methods. The processor 404 may perform MDT measurement (for instance, MDT UL Measurements) according to the embodiments herein.

A UE 412 includes a processor 414, a memory 416, and an RF unit 418. The memory 416 is coupled to the processor 414, and stores a variety of information for driving the processor 414. The RF unit 418 is coupled to the processor 414, and transmits and/or receives a radio signal.

The processor 414 implements the proposed functions, processes and/or methods. The processor 414 may perform MDT measurement (for instance, 'legacy' MDT measurements) according to the embodiments herein.

Memory 406 and/or 416 may be used for storing information to be used in achieving operations associated with network measurements, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information in any communication system could be provided in any database, register, table, cache, queue, control list, or storage structure, based on particular needs and implementations, all of which could be referenced in any suitable timeframe. Any of the memory or storage items discussed herein should be construed as being encompassed within the broad term "memory" or "memory element" as used herein in this disclosure.

In example embodiments, the operations for managing signal interference outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements can store data used for the operations described herein. This includes the memory elements being able to store software, logic, code, or processor instructions that are executed to carry out the activities described in this disclosure.

Additionally, the processors, or processing units, herein may execute any type of instructions associated with the data to achieve the operations detailed herein in this disclosure. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Processors 404, 414 may be a number of processors, a multi-processor core, a shared processor, or some other type of processor, depending on the particular implementation. A number, as used herein with reference to an item, means one or more items. Further, processors 404, 414 may be implemented using a number of heterogeneous processor systems in which a main processor is present with secondary processors on a single chip. As another illustrative example, processors 404, 414 may be a symmetric multi-processor system containing multiple processors of the same type.

RF units 408, 418 may include transceivers used to transmit and/or receive a radio signal.

BS 402 further may include measuring unit 420 and determining unit 422.

Measuring unit 420 may be a unit connected to at least processor 404. Measuring unit 420 may be configured to measure at least one network parameter at the radio access network to form at least one network measurement Determining unit 422 may be connected to at least processor 404. Determining unit 422 may be configured to determine whether the at least one network measurement satisfies a threshold.

In one or more aspects of this disclosure, measuring unit 420 and determining unit 422 may be located on processor 404 or part of the logic executed by processor 404.

Figure 5:
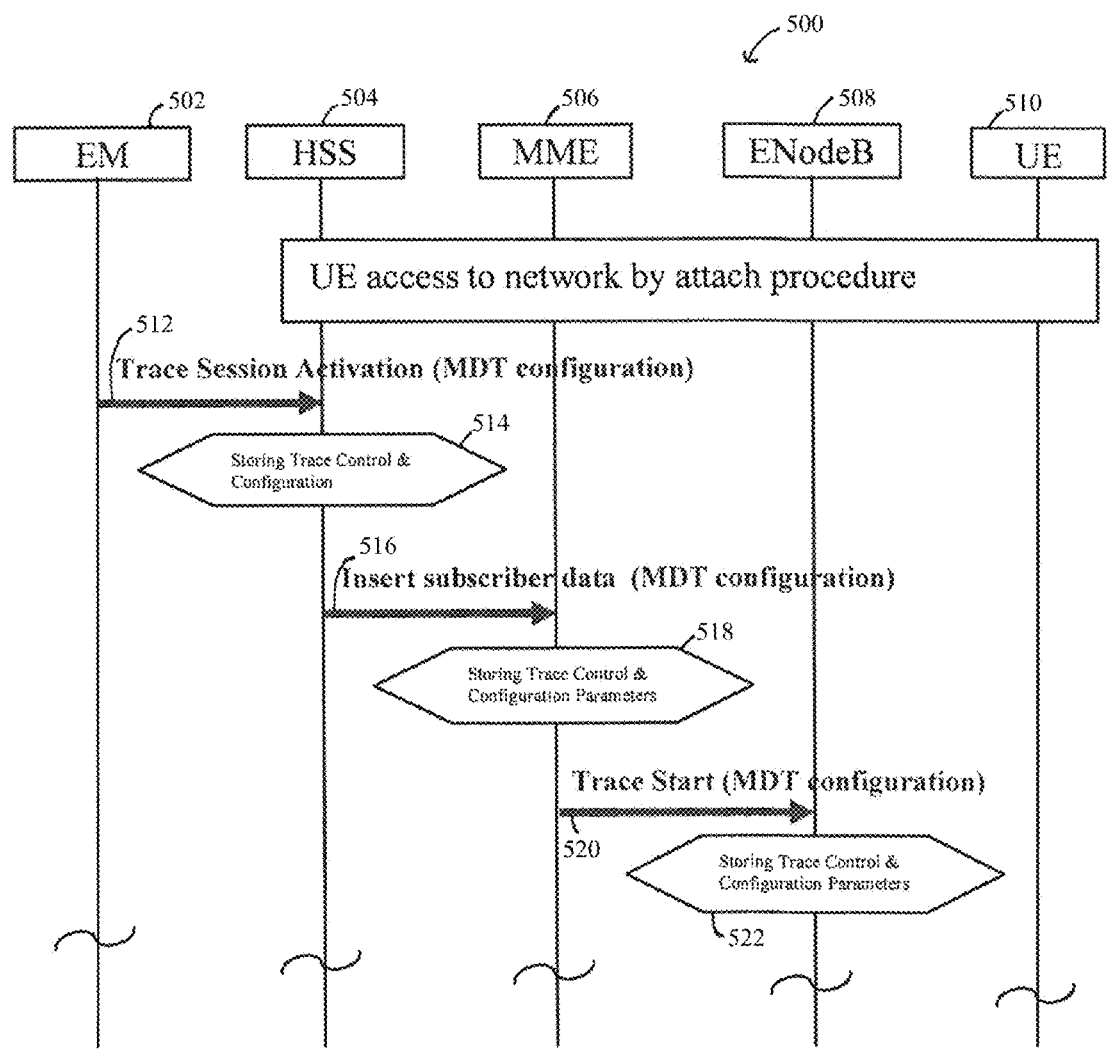
FIG. 5 is an illustration of steps in MDT activation in accordance with an aspect of this disclosure.

FIG. 5 is an illustration of steps in MDT activation in accordance with an aspect of this disclosure. The MDT activation procedure 500 includes the entities of element manager (EM) 502, home subscriber server (HSS) 504, mobility management entity (MME) 506, evolved NodeB (eNodeB) 508 or a RAN node, and user equipment (UE) 510.

The first step is for UE 510 to attach itself to the network by communication with HSS 504, MME 506, and eNodeB 508.

After attachment, trace session activation message 512 is sent from EM 502 to HSS 504. Trace session activation message 512 may have MDT UL Measurement control information. This information may include the parameters to measure for eNodeB 508 or for the relevant RAN node. After message 512, HSS 504 may store the trace control and configuration parameters (step 514).

After step 514, insert subscriber data message 516 is sent from HSS 504 to MME 506. Insert subscriber data message 516 may have MDT UL Measurement control information. Message 516 may also include subscriber data. After message 516, MME 506 may store the trace control and configuration parameters (step 518). The MME is responsible for considering the MDT user consent information upon activation of an MDT trace session for the UE.

After step 518, trace start message 520 is sent from MME 506 to eNodeB 508 (or, generally speaking, to the relevant RAN node). Trace start message 520 may have MDT UL Measurement control information. Message 520 may also include the request for the measurements. After message 520, eNodeB 508 may store the trace control and configuration parameters (step 522). The eNodeB or the relevant RAN node would be responsible for setting up a connection to the UE (if needed), for separating the UL MDT measurement configuration part from the 'legacy' MDT measurement configuration part, and for sending the latter to the UE.

In other words, inside the eNB 508 or inside the relevant RAN node the trace-based MDT configuration is split into two parts: the inventive parameters are processed on eNB 508 side for performing the requested MDT UL Measurements, while the rest of the MDT configuration parameters are sent over the air interface to the respective UE 510.

Messages 512, 516, 520 may all be MDT configuration commands. Each message 512, 516, 520 may include the parameter values for eNodeB 508 to measure. For example, messages 512, 516, 520 may include the parameter of received interference power, as included in Table 1. In an aspect of this disclosure, each message 512, 516, 520 may also include the network measurement configuration command, which may be split into at least first network measurements and second network measurements. In another example, messages 512, 516, 520 may include a threshold parameter as part of the configuration command to be taken into account for reporting the MDT UL Measurements. This is also shown in Table 1.

504, mobility management entity (MME) 506, evolved NodeB (eNodeB) 508 or a RAN node, and user equipment (UE) 510.

Procedure 600 continues from procedure 500 with trace start message 520 and store 522.

ENodeB 508 begins by starting the trace recording session (step 602). MDT criteria checking may also be performed (step 604). Then, message 606 may be sent from eNodeB 508 to UE 510 for RRC connection reconfiguration. A response message 608 may be returned to eNodeB 508 confirmation completion of the RRC connection configuration. Then, MDT criteria checking may be performed on UE 510 (step 610).

ENodeB 508 (or, generally speaking, the relevant RAN node) may then collect uplink measurements for MDT in step 612.

Figure 7:
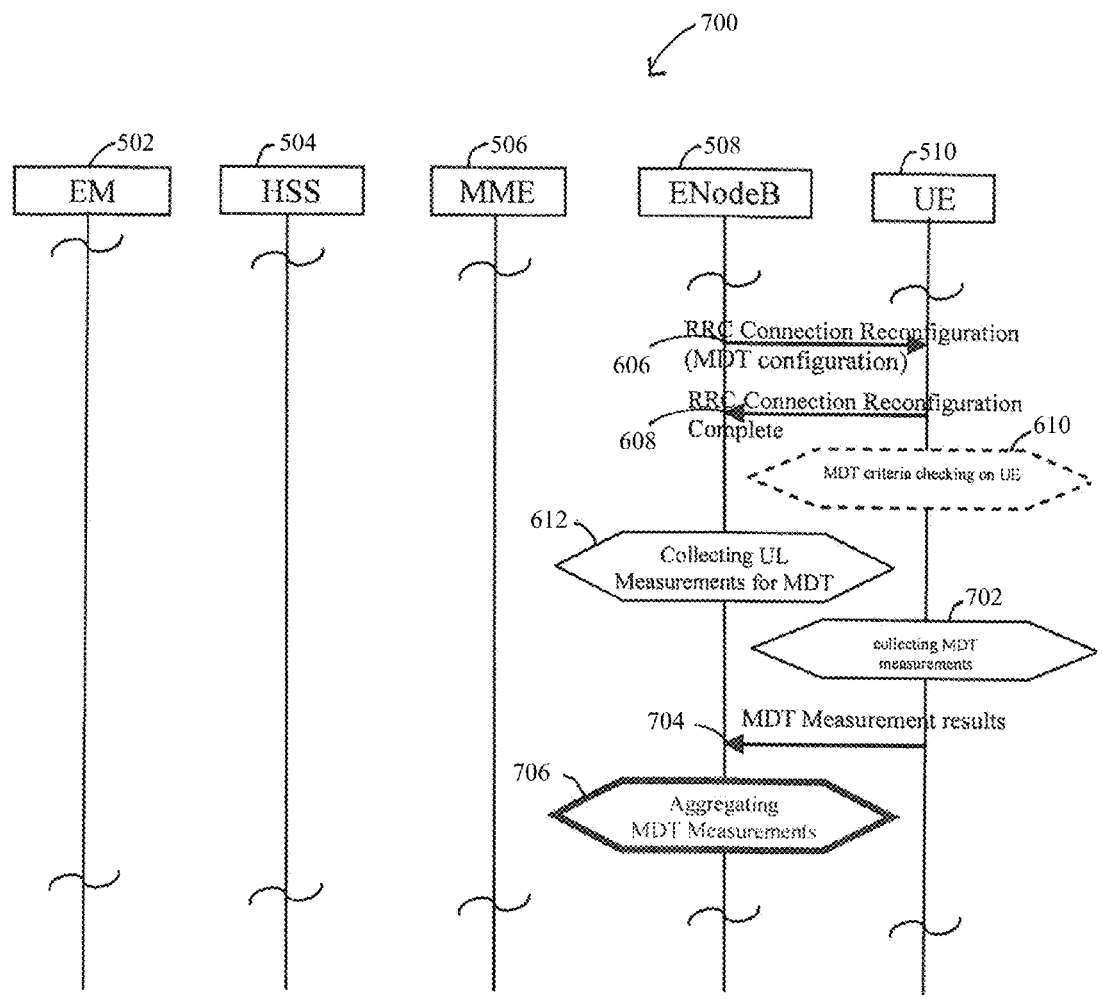
FIG. 7 is an illustration of steps in aggregating UL measurements in accordance with an aspect of this disclosure.

FIG. 7 is an illustration of steps in aggregating UL measurements in accordance with an aspect of this disclosure. The aggregation procedure 700 includes the entities of element manager (EM) 502, home subscriber server (HSS) 504, mobility management entity (MME) 506, evolved NodeB (eNodeB) 508 or a RAN node, and user equipment (UE) 510. Procedure 700 continues from procedure 600.

UE 510 begins by collecting MDT measurements (step 702).

In a first embodiment the MDT measurements are then reported back to eNodeB 508 (step 704) upon request by the radio access network. In a second embodiment the MDT measurements are then reported back to eNodeB 508 (step 704) when certain reporting conditions are met, while in a third embodiment, the eNB 508 periodically receives from UE 510 the MDT measurements that were collected by the UE.

In eNB 508, the UL measurements collected by eNB 508 itself and the measurements collected by UE 510 are combined in a single trace-base MDT report (step 706). In this example, it may be assumed that the periodicity for the two collection entities (eNB and UE) is the same. In other aspects, the periodicity may not be the same.

Figure 8:
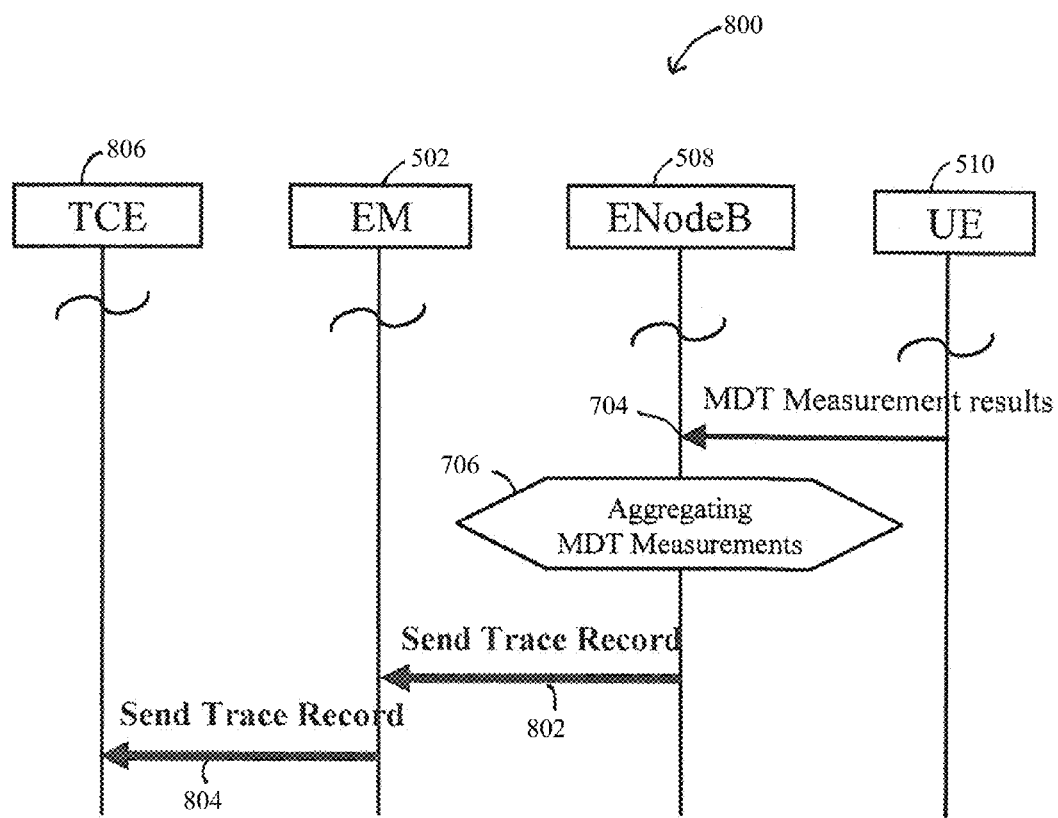
FIG. 8 is an illustration of steps in reporting UL measurements in accordance with an aspect of this disclosure.

FIG. 8 is an illustration of steps in reporting UL measurements in accordance with an aspect of this disclosure. The reporting of UL measurements procedure 800 includes the entities of element manager (EM) 502, evolved NodeB (eNo-

TABLE 1

|  | Name | Value | Comment |
| --- | --- | --- | --- |
| Quantity to be measured | Received Interference Power (e.g, as defined in TS 36.214) | On / Off | Used to turn on/off UL MDT Measurements on the physical layer. |
| Reporting Threshold | $T_{RIP}$ | Threshold Value (configurable) | Reporting is only done if the measured value is below or above the threshold given here. |

In other aspects, messages 512, 516, 520 may include requests for other parameters, such as UPH (UE Power Headroom) and RTWP (Received Total Wideband Power) for UMTS, and Received Interference Power measurement (as defined in 3GPP TS 36.214) together with RSRP (Reference Signal Received Power) and PH (Power Headroom) reports for LTE.

Figure 6:
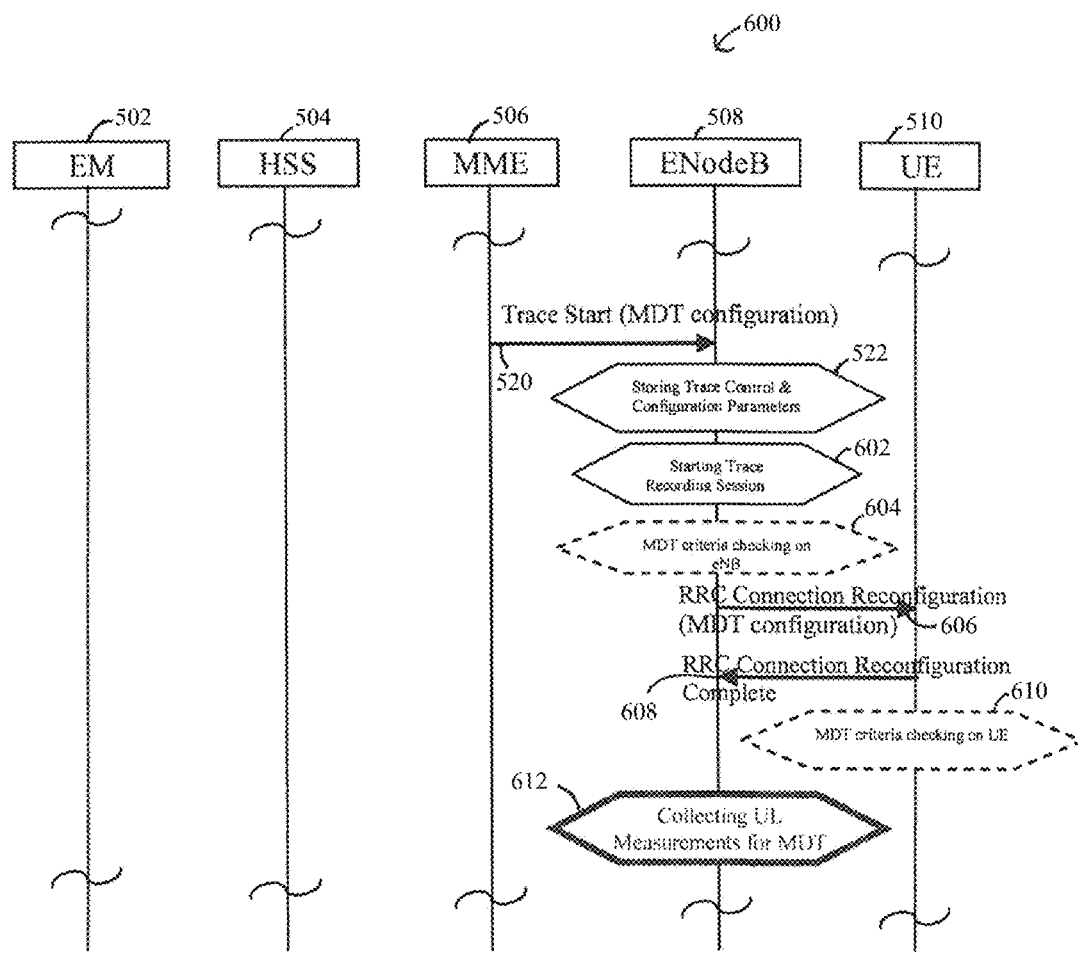
FIG. 6 is an illustration of steps in performing UL measurements in accordance with an aspect of this disclosure.

FIG. 6 is an illustration of steps in performing UL measurements in accordance with an aspect of this disclosure. The UL measurements procedure 600 includes the entities of element manager (EM) 502, home subscriber server (HSS)

deB) 508 or a RAN node, and user equipment (UE) 510. Procedure 800 continues from procedure 700.

ENodeB 508 begins by sending a trace record to element manager 502 (step 802). EM 502 then forwards the trace record to trace collection entity 806 (TCE) (step 804).

The combined MDT measurements are conveyed from the eNB in a trace-based MDT report to the TCE which may be the "MDT Server" or which may pass on the combined MDT measurements to the "MDT Server".

In the trace-based MDT report the following new parameters (name-value pairs) are added to allow reporting of MDT Uplink Measurements:

| Name | Value | Comment |
|---|---|---|
| Quantity to be measured | Received Interference Power (e.g, as defined in TS 36.214) | RIP value | UL MDT Measurements results on the physical layer. |

The RIP value number is the number of uplink PRB (Physical Resource Blocks). Alternatively, other aspects may use:

Alt.1: RIP value for each uplink PRB, total number is N_RB (uplink);

Alt.2: One averaged RIP value for linear average over all uplink PRBs;

Alt.3: Alt.1+Alt.2

Furthermore, the RIP Value may be measured when the MDT report is received from the UE. In this aspect, the UL MDT measurements are roughly synchronized with the periodicity of the MDT report generated on the UE side. Alternatively, there are more RIP value measurements within a UE's reporting cycle and the node that is in charge of performing MDT UL measurements generates a mean value over time that is reported at the same time when a report from the UE is received.

Figure 9:
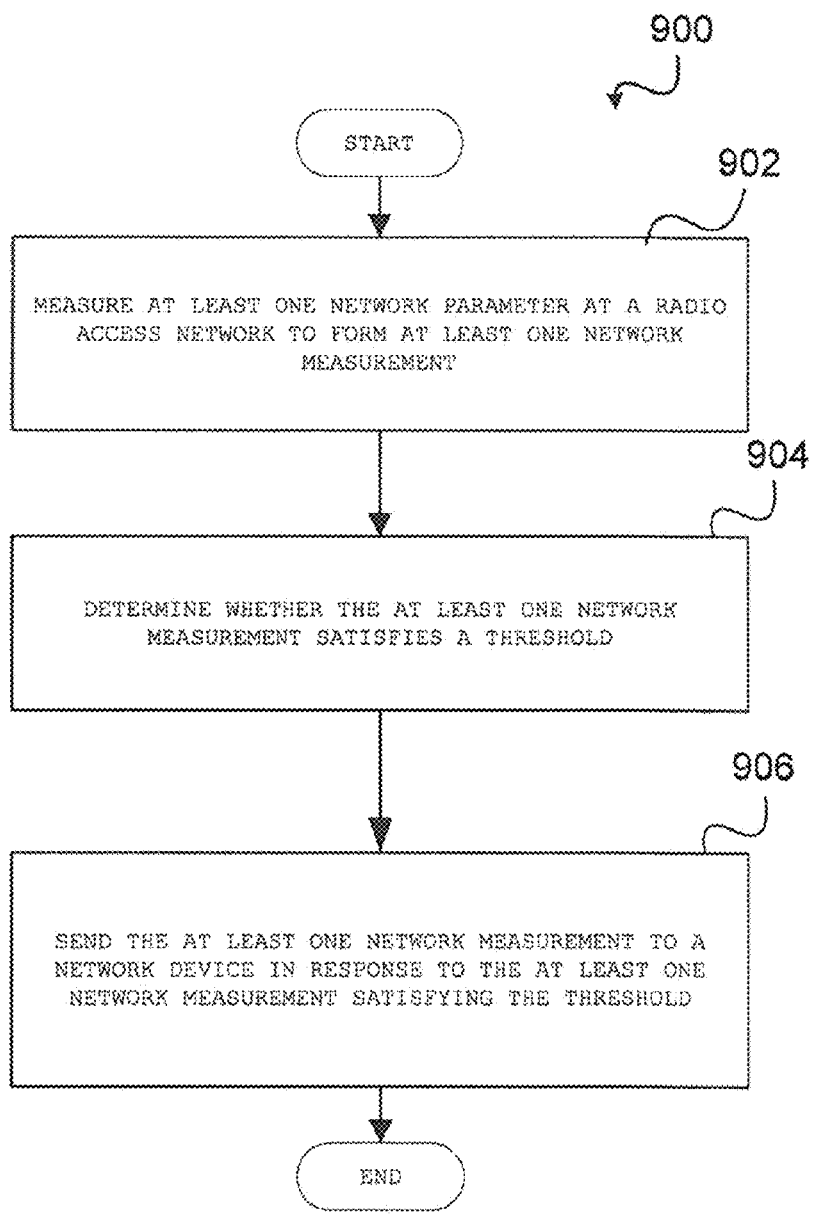
FIG. 9 is a flowchart of a process for managing network measurements according to an aspect of this disclosure.

FIG. 9 is a flowchart of a process for managing network measurements according to an aspect of this disclosure. Process 900 may manage network measurements. During MDT measurements, process 900 enables some measurements to be performed by a radio access network.

In an aspect of this disclosure, the process begins with measuring at least one network parameter at a radio access network to form at least one network measurement (step 902). The network parameter may be an uplink measurement. The uplink measurements may be related to UL coverage optimizations, QoS verification, IP throughput measurements, and/or other suitable measurements. A physical uplink measurement parameter that may be suited to drive statements about the uplink channel quality UL coverage, QoS verification, and/or IP throughput may be, for example, the received interference power. Other parameters, for example, may be the uplink signal interference to noise ratio value and the uplink bit error rate statistics.

In an aspect of this disclosure, step 902 may be performed in response to a request. The request may come from any device in the network. For example, the request may come from the MDT server. In another aspect, step 902 is done on a predefined schedule.

In an aspect of this disclosure, the network parameter may be related to a connection between the radio access network and user equipment. For example, the network parameter may be related to the uplink channels.

Next, the process determines whether the at least one network measurement satisfies a threshold (step 904). To satisfy the threshold, the network measurement may have to be greater than or less than the threshold, depending on the type of network measurement. During process 900, many types of network parameters may be measured. Each type may be compared against its own threshold. Then, each type may or may not be reported based on whether its own threshold.

Next, responsive to the at least one network measurement satisfying the threshold, the process sends the at least one network measurement to a network device (step 906). By sending the network measurement to the network device, the process is reporting the measurement. As shown in step 904, only those measurements which meet their threshold may be reported. The network device may be a trace collection entity or MDT server, or an intermediate device. Thereafter, the process terminates.

Figure 10:
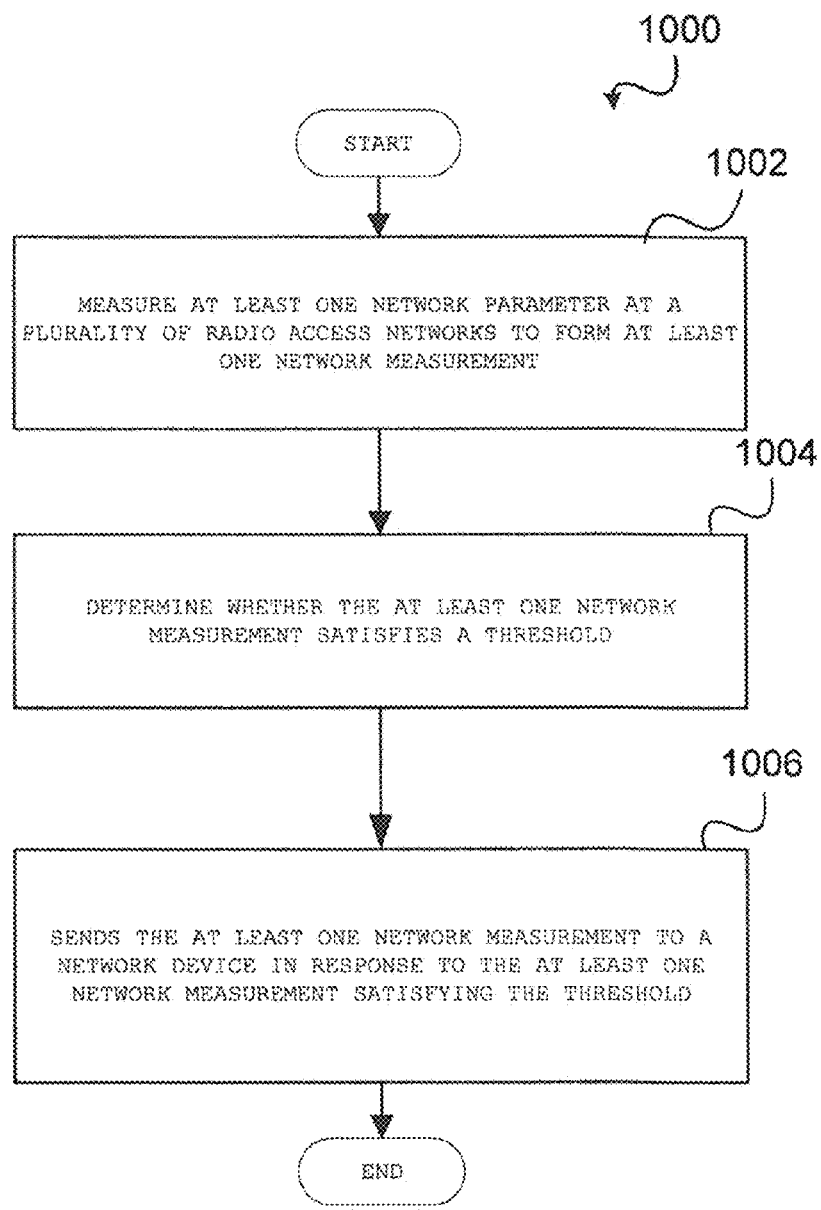
FIG. 10 is a flowchart for managing network measurements with multiple radio access networks according to an aspect of this disclosure.

FIG. 10 is a flowchart for managing network measurements with multiple radio access networks according to an aspect of this disclosure. Process 1000 may be similar to process 900 except process 1000 includes user equipment connected to multiple radio access networks.

In an aspect of this disclosure, the process begins with measuring at least one network parameter at a plurality of radio access networks to form at least one network measurement (step 1002). The network parameter may be measured at a plurality radio access networks or at a plurality of multiple RAN nodes for the same user equipment that is connected to the plurality of radio access networks. For example, the received interference power may be measured at two radio access networks which are connected to a single user equipment.

Next, the process determines whether the at least one network measurement satisfies a threshold (step 1004). The threshold may be required to be satisfied at some or all radio access networks in order to send the report.

Next, responsive to the at least one network measurement satisfying the threshold, the process sends the at least one network measurement to a network device (step 1006). The measurements from each radio access network may be combined into the network measurement. In another aspect, the measurements may be sent as separate measurements. Thereafter, the process terminates.

Figure 11:
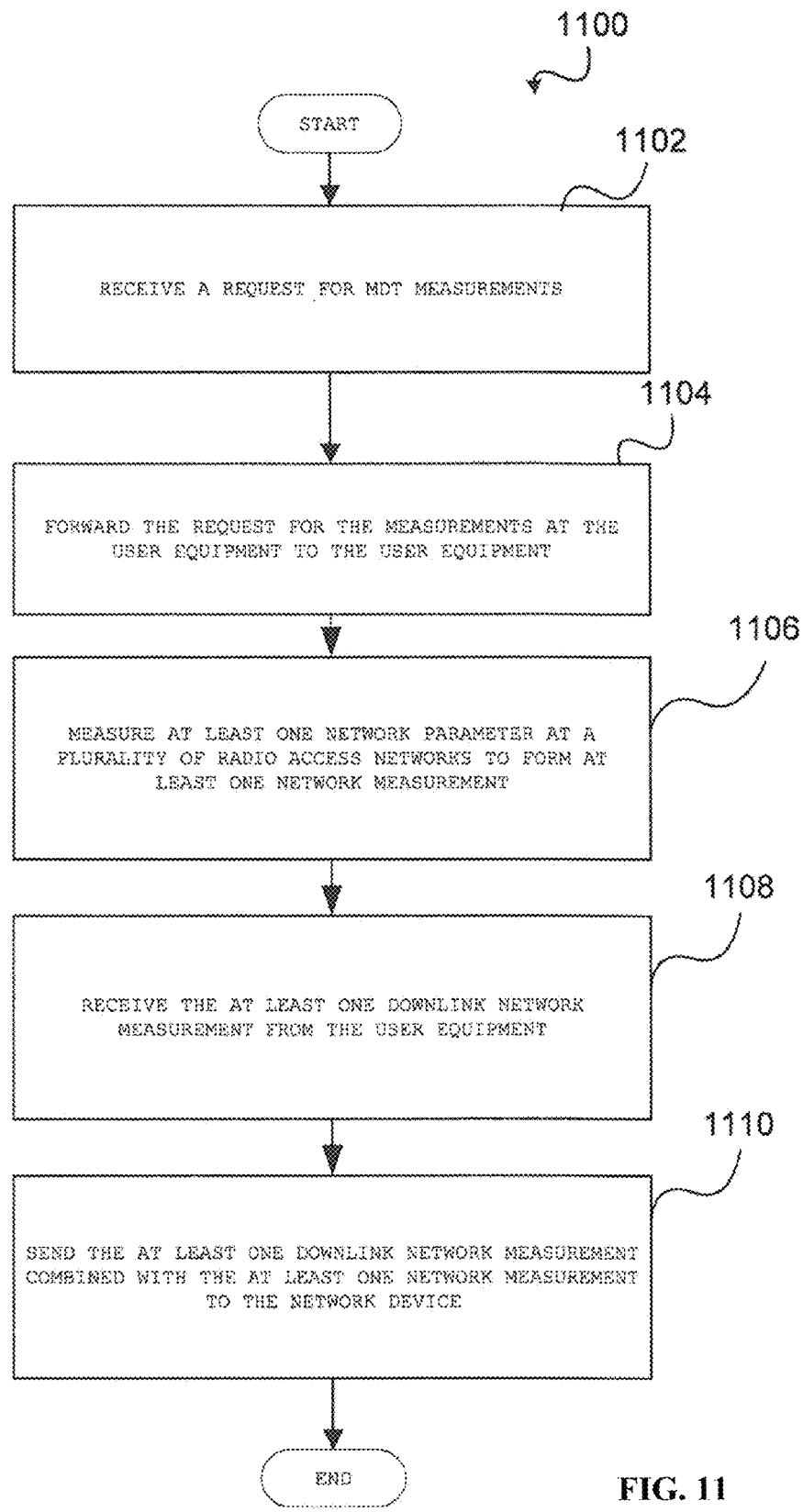
FIG. 11 is a flowchart for managing network measurements with multiple radio access networks according to an aspect of this disclosure.

FIG. 11 is a flowchart for managing network measurements with multiple radio access networks according to an aspect of this disclosure. Process 1100 may be similar to process 900 except process 1100 includes user equipment connected to multiple radio access networks.

In an aspect of this disclosure, the process begins with receiving a request for MDT measurements (step 1102). The MDT measurements may include downlink measurement requests at user equipment and uplink measurement requests at a radio access network or at a relevant RAN node.

Next, the process forwards the request for the measurements at the user equipment to the user equipment (step 1104). Then, the process measures at least one network parameter at a plurality of radio access networks to form at least one network measurement (step 1106). Next, the process receives the at least one downlink network measurement from the user equipment (step 1108). The at least one downlink network measurement may be received from the user equipment.

Then, the process sends the at least one downlink network measurement combined with the at least one network measurement to the network device (step 1110). In an aspect, step 1110 may be performed in response to step 1108. Thereafter, the process terminates.

In the above processes, the different features may be combined in different combinations. For example, process 900 may also include multiple radio access networks as shown in process 1000.

Figure 12:
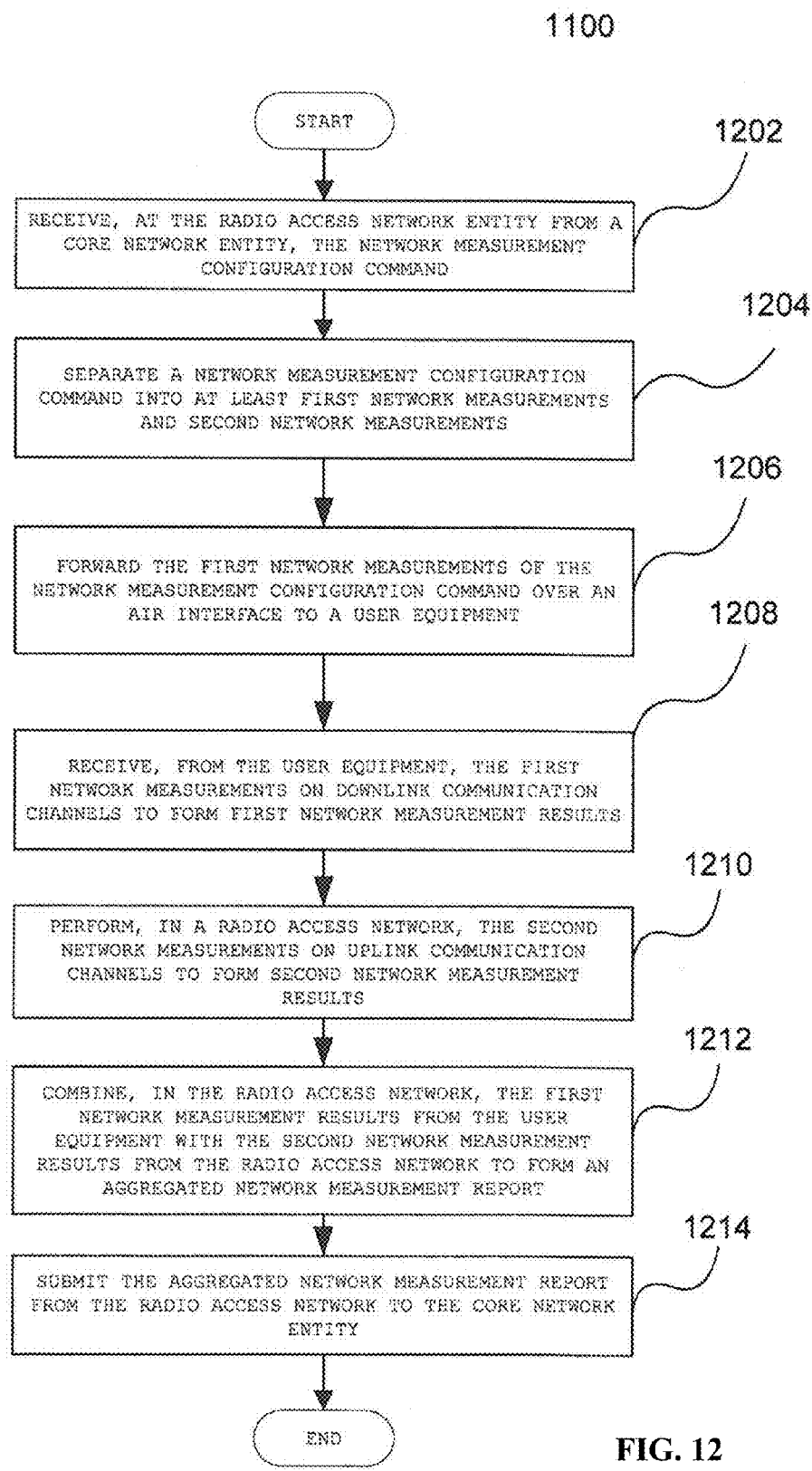
FIG. 12 is a flowchart for managing network measurements for MDT according to an aspect of this disclosure.

FIG. 12 is a flowchart for managing network measurements for MDT according to an aspect of this disclosure.

In an aspect of this disclosure, the process begins with receiving, at the radio access network entity from a core network entity, the network measurement configuration command (step 1202). The MDT measurements may include downlink measurement requests at user equipment and uplink measurement requests at a radio access network or at a relevant RAN node.

Then, the process separates a network measurement configuration command into at least first network measurements and second network measurements (step 1204). These may be the uplink measurements and the downlink measurements.

Next, the process forwards the first network measurements of the network measurement configuration command over an air interface to a user equipment (step 1206).

Then, the process receives, from the user equipment, the first network measurements on downlink communication channels to form first network measurement results (step 1208). The at least one downlink network measurement may be received from the user equipment.

Next, the process performing, in a radio access network, the second network measurements on uplink communication channels to form second network measurement results (step 1210). In different aspects of this disclosure, steps 1206 and 1208 may come after step 1210, or step 1210 may come in between steps 1206 and 1208, or occur simultaneously with steps 1206 and 1208.

Then, the process combines, in the radio access network, the first network measurement results from the user equipment with the second network measurement results from the radio access network to form an aggregated network measurement report (step 1212).

Finally, the process submits the aggregated network measurement report from the radio access network to the core network entity (step 1214). Thereafter, the process terminates.

In an aspect of this disclosure, a method for managing network measurements, the method comprising: measuring at least one network parameter at a radio access network to form at least one network measurement; determining whether the at least one network measurement satisfies a threshold; and responsive to the at least one network measurement satisfying the threshold, sending the at least one network measurement to a network device.

In an example aspect, the method further comprises: responsive to the at least one network measurement failing to satisfy the threshold, declining to send the at least one network measurement to the network device.

In an example aspect, the method further comprises: receiving a request to measure the at least one network parameter.

In an example aspect, the at least one network parameter is related to a connection between the radio access network and a user equipment.

In an example aspect, the method further comprises: measuring a second network parameter at a second radio access network to form a second network measurement, wherein the second network measurement is related to a connection between the second radio access network and the user equipment; and sending the second network measurement to the network device.

In an example aspect, the method further comprises: receiving a request for at least one downlink network measurement to measure at a user equipment; forwarding the request to the user equipment; receiving the at least one downlink network measurement; and sending the at least one downlink network measurement combined with the at least one network measurement to the network device.

In an example aspect, the step of measuring comprises: measuring the at least one network parameter periodically.

In an example aspect, the step of measuring comprises: measuring the at least one network parameter for all resource blocks to form a plurality of measurements; and averaging the plurality of measurements to form the at least one network measurement.

In an example aspect, the step of measuring comprises: measuring the at least one network parameter is performed when the at least one downlink network measurement is received.

In an aspect of this disclosure, a radio access network is provided. The radio access network comprises: a measuring unit configured to measure at least one network parameter at the radio access network to form at least one network measurement; a determining unit configured to determine whether the at least one network measurement satisfies a threshold; and a transceiver configured to send the at least one network measurement to a network device in response to the at least one network measurement satisfying the threshold.

In an example aspect, the radio access network further comprises: responsive to the at least one network measurement failing to satisfy the threshold, declining to send the at least one network measurement to the network device.

In an example aspect, the radio access network further comprises: the transceiver configured to receive a request to measure the at least one network parameter.

In an example aspect, the at least one network parameter is related to a connection between the radio access network and a user equipment.

In an example aspect, the radio access network further comprises: the transceiver configured to receive a request for at least one downlink network measurement to measure at a user equipment; forward the request to the user equipment; receive the at least one downlink network measurement; and send the at least one downlink network measurement combined with the at least one network measurement to the network device.

In an example aspect, the step of measuring comprises: measuring the at least one network parameter periodically.

In an example aspect, the step of measuring comprises: measuring the at least one network parameter for all resource blocks to form a plurality of measurements; and averaging the plurality of measurements to form the at least one network measurement.

In an example aspect, the step of measuring comprises: measuring the at least one network parameter is performed when the at least one downlink network measurement is received.

In an aspect of this disclosure, a system for managing network measurements is provided. The system comprises: a radio access network device configured to measure at least one network parameter at a radio access network device to form at least one network measurement; determine whether the at least one network measurement satisfies a threshold; and responsive to the at least one network measurement satisfying the threshold, send the at least one network measurement to a network device.

In an example aspect, the system further comprises: a second radio access network device configured to measure a second network parameter to form a second network measurement, wherein the second network measurement is related to a connection between the second radio access network device and the user equipment; and send the second network measurement to the network device.

In an example aspect, the system further comprises: a user equipment configured to receive a request forwarded from the radio access network device for at least one downlink network parameter to measure at a user equipment; measure the at least one downlink network parameter to form at least one downlink network measurement; and send the at least one downlink network measurement to the radio access network device.

An aspect of this disclosure provides a method for managing network measurements. The method comprises: separating a network measurement configuration command into at least first network measurements and second network measurements; forwarding the first network measurements of the network measurement configuration command over an air interface to a user equipment; receiving, from the user equipment, the first network measurements on downlink communication channels to form first network measurement results; performing, in a radio access network, the second network measurements on uplink communication channels to form second network measurement results; and combining, in the radio access network, the first network measurement results from the user equipment with the second network measurement results from the radio access network to form an aggregated network measurement report.

In an example aspect, the method further comprises: combining, in the radio access network, the first network measurement results from the user equipment with the second network measurement results from the radio access network to form an aggregated network measurement report.

In an example aspect, the method further comprises: receiving, at the radio access network entity from a core network entity, the network measurement configuration command.

In an example aspect, the method further comprises: submitting the aggregated network measurement report from the radio access network to the core network entity.

In an example aspect, combining further comprises: determining if at least one of the second network measurements each satisfy a threshold; and responsive to the second network measurements satisfying the threshold, combining the first network measurement results from the user equipment with the at least one of the second network measurement results that satisfied the threshold from the radio access network to form an aggregated network measurement report.

In an example aspect, the method further comprises: receiving, at the radio access network entity from a core network entity, the network measurement configuration command; and submitting the aggregated network measurement report from the radio access network to the core network entity.

In an example aspect, the network measurement configuration command comprises at least one network measurement parameter.

In an example aspect, the method further comprises: keeping the second network measurements of the network measurement configuration command inside the radio access network.

In an example aspect, keeping the second network measurements comprises: distributing the second network measurements of the network measurement configuration command among different radio access network entities. In one or more example aspects, the second network measurements may only be distributed among different RAN entities if needed. For example, in the case of CoMP (Coordinated Multipoint Transmission and Reception).

In an example aspect, the first and second network measurements are configured in the scope of MDT.

In an example aspect, the first and second network measurement results are collected in the scope of MDT.

In an example aspect, the radio access network is an E-UTRAN according to LTE standards.

In an example aspect, the radio access network entity is an eNodeB according to LTE standards.

In an example aspect, the radio access network is a UTRAN according to UMTS standards.

In an example aspect, the radio access network entity is at least one entity according to the UMTS standard selected from a group consisting of a NodeB and an RNC.

In an example aspect, the core network entity is selected from a group consisting of an MDT Server, a Trace Collection Entity (TCE), and an Element Manager (EM).

In an example aspect, the second network measurements on uplink communication channels are collected in accordance with a parameter from a group consisting of UL Coverage Optimization, QoS Verification, and IP Throughput Measurement.

In an example aspect, the UL Coverage Optimization comprises the parameters of Received Interference Power (RIP) measurements.

In an example aspect, the UL Coverage Optimization comprises the parameters of Received Interference Power (RIP) measurements together with RSRP (Reference Signal Received Power) and PH (Power Headroom).

In an example aspect, the QoS Verification and IP Throughput Measurement comprises the parameter IP throughput measurements.

In an aspect of this disclosure, a radio access network device is provided. The radio access network comprises: a memory element; and a processing unit coupled to the memory element, the processing unit configured to: separate a network measurement configuration command into at least first network measurements and second network measurements; forward the first network measurements of the network measurement configuration command over an air interface to a user equipment; receive, from the user equipment, the first network measurements on downlink communication channels to form first network measurement results; perform, in the radio access network device, the second network measurements on uplink communication channels to form second network measurement results; and combine, in the radio access network device, the first network measurement results from the user equipment with the second network measurement results from the radio access network device to form an aggregated network measurement report.

In an example aspect, the processing unit is further configured to: receive, at the radio access network device from a core network entity, the network measurement configuration command; and submit the aggregated network measurement report from the radio access network device to the core network entity.

In an aspect of this disclosure, a system is provided for managing network measurements. The system comprises: a radio access network device configured to: separate a network measurement configuration command into at least first network measurements and second network measurements; forward the first network measurements of the network measurement configuration command over an air interface to a user equipment; perform the second network measurements on uplink communication channels to form second network measurement results; combine a first network measurement results from the user equipment with the second network measurement results from the radio access network device to form an aggregated network measurement report; and the user equipment configured to perform the first network measurements on downlink communication channels to form first network measurement results.

In an example aspect, the system further comprises: a core network entity configured to submit the network measurement configuration command to the radio access network device; and the radio access network device configured to submit the aggregated network measurement report from the radio access network device to the core network entity.

In an example aspect, the system further comprises: a number of other radio access network devices configured to receive the second network measurements of the network measurement configuration command.

The invention claimed is:

1. An apparatus comprising:
one or more non-transitory, computer readable media including instructions; and
one or more processors coupled with the one or more non-transitory, computer-readable media to execute the instructions to cause an access node of a radio access network to:
separate a network measurement configuration command into at least first network measurement parameters and second network measurement parameters, wherein the second network parameters include a first parameter to turn on or off uplink received interference power (RIP) measurements on a physical layer and a second parameter to provide a threshold value;
forward the first network measurement parameters of the network measurement configuration command over an air interface to a user equipment to perform first network measurements on downlink communication channels;
receive, from the user equipment, the first network measurements on downlink communication channels to form first network measurement results;
perform, based on the second network measurement parameters, second network measurements on uplink communication channels to form second network measurement results, the second network measurement results to include a measured value of RIP;
compare the measured value to the threshold value; and
transmit the second network measurement results to a core network entity based on comparison of the measured value to the threshold value.

2. The apparatus according to claim 1, wherein the one or more processors are to execute the instructions to further cause the access node to:
combine, in the radio access network, the first network measurement results from the user equipment with the second network measurement results from the radio access network to form an aggregated network measurement report.

3. The apparatus according to claim 1, wherein the one or more processors are to execute the instructions to further cause the access node to:
receive, from a core network entity, the network measurement configuration command.

4. The apparatus according to claim 2, wherein the one or more processors are to execute the instructions to further cause the access node to:
submit the aggregated network measurement report from the radio access network to the core network entity.

5. The apparatus according to claim 2, wherein the one or more processors are to execute the instructions to further cause the access node to combine the first network measurement results with the second network measurement results based on said comparison of the measured value to threshold value.

6. The apparatus according to claim 1, wherein the one or more processors are to execute the instructions to further cause the access node to:
keep the second network measurements of the network measurement configuration command inside the radio access network.

7. The apparatus according to claim 6, wherein to keep the second network measurements inside the radio access network comprises:
distribute the second network measurements of the network measurement configuration command among different radio access network entities.

8. The apparatus according to claim 1, wherein the radio access network is an E-UTRAN according to LTE standards.

9. The apparatus according to claim 3, wherein the access node is an eNodeB according to LTE standards.

10. The apparatus according to claim 1, wherein the radio access network is a UTRAN according to UMTS standards.

11. The apparatus according to claim 3, wherein the access node is at least one entity according to the UMTS standard selected from a group consisting of a NodeB and an RNC.

12. The apparatus according to claim 3, wherein the core network entity is selected from a group consisting of an MDT Server, a Trace Collection Entity, and an Element Manager.

13. The apparatus according to claim 1, wherein the second network measurements on uplink communication channels are collected in accordance with a parameter from a group consisting of UL Coverage Optimization, QoS Verification, and IP Throughput Measurement.

14. The apparatus according to claim 13, wherein the UL Coverage Optimization comprises Reference Signal Received Power and Power Headroom.

15. The apparatus according to claim 13, wherein the QoS Verification and IP Throughput Measurement comprises IP throughput measurements.

16. A radio access network device, comprising:
a memory element; and
a processing unit coupled to the memory element, the processing unit to:
separate a network measurement configuration command into at least first network measurement parameters and second network measurement parameters wherein the second network parameters include a first parameter to turn on or off uplink received interference power (RIP) measurements on a physical layer and a second parameter to provide a threshold value;
forward the first network measurement parameters of the network measurement configuration command over an air interface to a user equipment to perform first network measurements on downlink communication channels;
receive, from the user equipment, the first network measurements on downlink communication channels to form first network measurement results;
perform, based on the second network measurement parameters, second network measurements on uplink communication channels to form second network measurement results, the second network measurement results to include a measured value of RIP;
compare the measured value to the threshold value; and
combine, based on said comparison, the first network measurement results from the user equipment with the second network measurement results from the radio access network device to form an aggregated network measurement report.

17. The radio access network device according to claim 16, wherein the processing unit is to:
receive, at the radio access network device from a core network entity, the network measurement configuration command; and submit the aggregated network measurement report from the radio access network device to the core network entity.

* * * * *